(12) United States Patent
Eromaki et al.

(10) Patent No.: US 12,063,343 B2
(45) Date of Patent: Aug. 13, 2024

(54) REPRESENTATION OF MEDIA DATA

(71) Applicant: Huawei Technologies Co., Ltd., Shenzhen (CN)

(72) Inventors: Marko Eromaki, Tampere (FI); Eero Salmelin, Tampere (FI); Hong Zhou, Leuven (BE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/758,925

(22) PCT Filed: Jan. 16, 2020

(86) PCT No.: PCT/EP2020/050993
§ 371 (c)(1),
(2) Date: Jul. 15, 2022

(87) PCT Pub. No.: WO2021/144025
PCT Pub. Date: Jul. 22, 2021

(65) Prior Publication Data
US 2023/0075650 A1 Mar. 9, 2023

(51) Int. Cl.
*H04N 13/368* (2018.01)
*H04N 13/10* (2018.01)
*H04N 13/117* (2018.01)
*H04N 13/178* (2018.01)
*H04N 13/194* (2018.05)
*H04N 13/332* (2018.01)
*H04N 21/6587* (2011.01)

(52) U.S. Cl.
CPC ........... *H04N 13/368* (2018.05); *H04N 13/10* (2018.05); *H04N 13/117* (2018.05); *H04N 13/178* (2018.05); *H04N 13/194* (2018.05); *H04N 13/332* (2018.05); *H04N 21/6587* (2013.01)

(58) Field of Classification Search
CPC ............. H04N 21/8146; H04N 21/472; H04N 21/6587; H04N 21/4728; H04N 21/816
See application file for complete search history.

(56) References Cited

U.S. PATENT DOCUMENTS

| 2004/0032531 | A1* | 2/2004 | Mercier | ............... | H04N 13/117 348/148 |
| 2019/0051051 | A1* | 2/2019 | Kaufman | ................... | G09B 9/06 |
| 2019/0174125 | A1 | 6/2019 | Ninan | | |
| 2020/0175842 | A1* | 6/2020 | Merjanian | ............... | G06F 3/011 |
| 2021/0019953 | A1* | 1/2021 | Pekelny | .................... | G06T 7/32 |
| 2021/0049840 | A1* | 2/2021 | Moghtadai | ............. | G07C 5/008 |
| 2021/0067840 | A1* | 3/2021 | Mate | ........................ | A63F 13/65 |
| 2021/0243418 | A1* | 8/2021 | Ojala | ................... | H04N 13/366 |

FOREIGN PATENT DOCUMENTS

| EP | 3468215 A1 | 4/2019 |
| GB | 2570298 A | 7/2019 |

\* cited by examiner

*Primary Examiner* — John R Schnurr
(74) *Attorney, Agent, or Firm* — SLATER MATSIL, LLP

(57) ABSTRACT

A media data preparation device adapted to receive media data, including at least one processor, and at least one non-transitory memory having computer program code stored thereon for execution by the at least one processor, the computer program code including instructions to receive a set of metadata that is based on at least one spatial coordinate, where the set of metadata is associated with the media data, and determine a representation of the media data in a virtual reality space based on the set of metadata

15 Claims, 8 Drawing Sheets

REPRESENTATION OF MEDIA DATA

CROSS REFERENCE TO RELATED APPLICATIONS

This application is a National Stage of International Application No. PCT/EP2020/050993, filed on Jan. 16, 2020, which is hereby incorporated by reference in its entirety.

TECHNICAL FIELD

The present application generally relates to the field of processing and preparing, respectively media data.

BACKGROUND

In various computer systems, a user may be provided with a user interface to control playback of media data such that a desired portion of the media data is played back. For example, a user may be enabled to forward or rewind video clips in time. Virtual reality (VR) technologies enable to provide an immersive video experience, for example, by means of a virtual reality headset such that a user may observe surrounding virtual content in a virtual reality space.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object of the invention to determine a representation of media data in a virtual reality space. The foregoing and other objects may be achieved by the features of the independent claims. Further implementation forms are apparent from the dependent claims, the description, and the figures.

According to a first aspect, a device, for example, a media data preparation device adapted to receive media data is provided. The device may comprise a memory storing instructions, the instructions being executable by a processor, to cause the device to receive a set of metadata that is based on at least one spatial coordinate. The set of metadata may be associated with the media data. The device may be further caused to determine a representation of the media data in the virtual reality space based on the set of metadata. This solution enables to provide an informative representation of media data in a virtual reality space which might be perceived by a user to be exhibited in a particularly realistic manner.

In an implementation form of the first aspect, determining the representation of the media data may comprise mapping the set of metadata to at least one location in the virtual reality space. This solution enables to provide a media representation that reflects the location of a user or a capture device during capture of the media data. The user may therefore observe location(s) associated with the media data in the virtual reality space.

In another implementation form of the first aspect, the media data may comprise a plurality of video frames. A subset of the set of metadata may correspond to each of the plurality of video frames. This solution enables to provide a video representation that reflects location of a user or capture device during capture of each video frame.

In another implementation form of the first aspect, the set of metadata may comprise at least one of location information, motion information and time information associated with the media data. This solution enables to provide location, motion, and/or time dependent media representation in the virtual reality space.

In another implementation form of the first aspect, the location information may comprise a plurality of locations associated with capture of the media data. This solution enables to map portions of the media data corresponding to different capture locations to corresponding locations in the virtual reality space. Alternatively, or additionally, the motion information may comprise a plurality of velocities associated with the capture of the media data. This solution enables to determine the capture location based on velocities and to provide the location dependent media representation in the virtual reality space.

In another implementation form of the first aspect, the motion information may comprise gyroscope data and/or magnetometer data. This solution enables the motion information to be locally recorded at the capture device.

In another implementation form of the first aspect, the representation of the media data may comprise a first representation of first media data and a second representation of second media data. The first representation and the second representation may intersect in the virtual reality space. This solution enables the user to easily observe spatial and temporal coincidence of media data in the virtual reality space. Furthermore, this solution enables to determine relationships between different media data and/or users associated therewith.

In another implementation form of the first aspect, the device may be further caused to detect a user input at a first location of the representation of the media data in the virtual reality space. The device may be further caused to perform an operation associated with the media data based on the first location. This solution enables an intuitive user interaction with the media data.

In another implementation form of the first aspect, detecting the user input may comprise detecting a body part of the user or a virtual reality controller to coincide with the representation of the media data in the virtual reality space at the first location. This solution enables to detect the user interaction with the media representation.

In another implementation form of the first aspect, detecting the user input may comprise detecting a head of the user to coincide with the representation of the media data in the virtual reality space at the first location. The position of the head of the user may be tracked for example based on at least one sensor associated with a virtual reality headset. This solution enables the user to interact with the media representation, for example, with an intuitive diving gesture.

In another implementation form of the first aspect, the operation may comprise initiating a playback of the media data from a portion of the media data associated with the first location. This solution enables the user to select a position for initiating media playback in the virtual reality space, for example based on the intuitive diving gesture. Alternatively, or additionally, the operation may comprise providing a preview of a portion of the media data associated with the first location. This solution enables the user to select a desired portion of the media data. Alternatively, or additionally, the operation may comprise editing the representation of the media data. This solution enables an intuitive user interface for modifying contents and/or order of playback of the media data in the virtual reality space.

In another implementation form of the first aspect, the device may be further caused to determine social network information based on the representation of the media data and/or the set of metadata. This solution enables to determine relationships between users associated with different media data, for example based on intersections of media representations. Alternatively, or additionally, the device may be caused to receive social network information associated with the media data. The device may be further caused to determine the representation of the media data based on the social network information and the set of metadata. This solution enables to provide the user with a media representation that takes into account relationships between users associated with different media data.

In another implementation form of the first aspect, the device may be further caused to receive contextual set of metadata associated with the media data. The device may be further caused to determine a prediction of at least one event based on the contextual set of metadata and/or the set of metadata. This solution enables to inform the user of future events or nature of future events such as for example encounters with other users.

According to a second aspect, a method is provided for preparing media data. The method may comprise receiving a set of metadata that is based on at least one spatial coordinate. The set of metadata may be associated with media data. The method may further comprise determining a representation of the media data in a virtual reality space based on the set of metadata. This solution enables to provide an informative representation of the media data in a VR space.

In an implementation form of the second aspect, the method may be executed in a device according to any implementation form of the first aspect.

According to a third aspect, a computer program may comprise computer program code configured to cause performance of any implementation form of the method of the second aspect, when the computer program is executed on a computer.

According to a fourth aspect a computer program product may comprise a computer readable storage medium storing program code thereon, the program code comprising instructions for executing the method according to any implementation form of the second aspect.

According to a fifth aspect, a device may comprise means for performing any implementation form of the method of the second aspect.

Implementation forms of the invention can thus provide a device, a method, a computer program, and a computer program product for determining a representation of media data in a virtual reality space. These and other aspects of the invention will be apparent from the embodiment(s) described below.

BRIEF DESCRIPTION OF THE DRAWINGS

The accompanying drawings, which are included to provide a further understanding of the embodiments of the invention and constitute a part of this specification, illustrate the embodiments and together with the description help to understand the embodiments. In the drawings.

Like references are used to designate like parts in the accompanying drawings.

DETAILED DESCRIPTION OF ILLUSTRATIVE EMBODIMENTS

Figure 1:
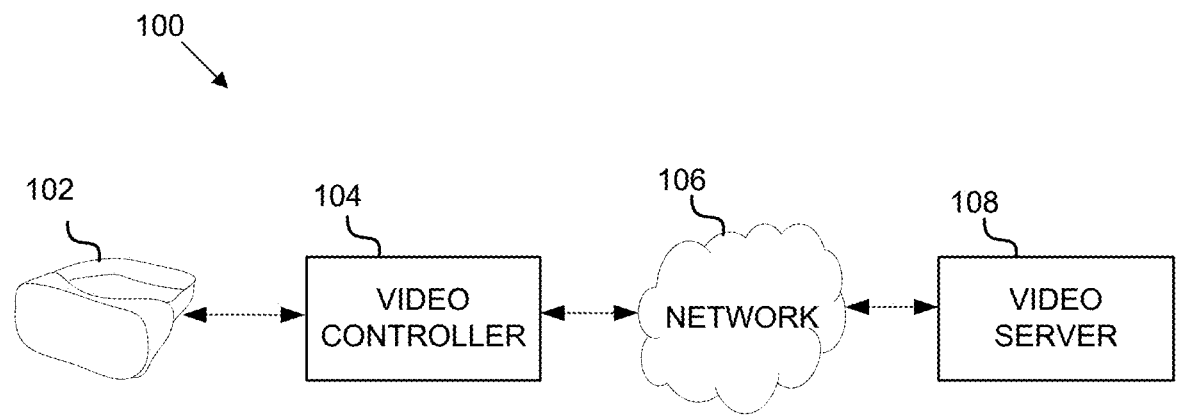
FIG. 1 illustrates an example of a video system, according to an embodiment of the invention.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Traditionally it is understood that there are three spatial dimensions (length, width, depth) that serve us to locate coordinates of an object in a space. Additionally, time may be seen to serve as a 4th dimension that is not spatial. Instead, the time dimension may be used to locate a position of an object in time. Since our physical world is three-dimensional, we cannot directly see time as it extends beyond our physical world observable at a time. We can only perceive the forward direction of time by observing how the physical world changes as it moves through the time. However, according to another point of view, the time we measure is seen as a purely mathematical value that has no physical existence itself. Accordingly, the time is seen as the fourth spatial dimension in a 'timeless' universe.

Therefore, example embodiments disclosed herein enable representation and analysis of media data, for example, one or more video files, based on time, motion, and/or location information associated with the media data. For example, an intuitive user interface for accessing or editing the media data may be provided in a virtual reality space. The time and space factors are thereby realized in a form that allows representation of media data in an informative manner.

In one scenario, a media capture device may be embodied as an everyday wearable or even an implant on a person. This way, the entire human life, or portion(s) thereof, may be captured and visualized as a media representation in the virtual reality space. This allows a user to jump into particular events or highlights at a blink of an eye. Also contextual metadata such as lifestyle data may be stored and associated with the media data. The contextual metadata may, for example, comprise data received from health sensors and/or a spectral camera. The lifestyle data may be then analyzed to estimate its influence on lifetime. The result of the lifetime estimation may be reflected in the length of the media representation.

According to an example embodiment, an apparatus adapted to receive media data may receive a set of metadata, for example, at least one spatial coordinate associated with media data. The set of metadata may be used to determine a representation of the media data, for example, a tube, in a virtual reality space such that the capture location and/or time information associated with the media data are reflected in the shape and/or length of the media representation.

FIG. 1 illustrates an example of a video system 100 according to an embodiment of the invention. The video system 100 may comprise a video device, represented by a virtual reality (VR) headset 102. However, the video device may in general comprise any device suitable for providing, or assisting in providing, virtual reality content to a user. For example, the video device may comprise a stand-alone VR headset or another device, for example, a mobile phone configured to be coupled to a VR headset, such that virtual reality content may be experienced at the display of the other device.

A virtual reality space may refer to a space observable by a user when consuming virtual reality content with a virtual reality device such as the for example VR headset 102. The virtual reality content may comprise, for example, omnidirectional video content such that a portion of the content is displayed to the user depending on the current viewing direction of the user. The virtual reality content may be three-dimensional, for example, stereoscopic, such that objects included in the virtual reality content appear at a particular location in the virtual reality space. For example, a particular object may appear at a certain direction at a certain depth in the virtual reality space. A virtual reality space may also mix real and virtual content such that virtual content may be augmented on top of a real-world view, for example, by means of see-through glasses. It is therefore understood that augmented reality (AR) or mixed reality (MR) may be considered as different forms of virtual reality. A virtual reality space may be also called a virtual space, a three-dimensional (3D) space, or a 3D virtual space.

The VR system 100 may further comprise a video controller 104 configured to carry out various control tasks such as retrieving, decoding, and/or processing video content such that it may be displayed at the VR headset 102. The video controller 104 may comprise a video player. The video controller 104 may be embodied as a separate device or it may be integrated in the VR headset 102, for example, as a software and/or hardware component. Therefore, the video controller 104 may communicate with the VR headset 102 over one or more internal or external communication interfaces, for example, a data bus, a wired connection, or a wireless connection.

The video system 100 may further comprise a video server 108 that may be configured to store video data and/or metadata associated with different users and to provide this data to the video controller 104 upon request. The video server 108 may be a local server, or the video server 108 may be accessed over a network 106, for example, the internet. It is however possible that video data and/or associated metadata are locally stored at the VR headset 102 or the video controller 104. Therefore, example embodiments may be implemented also without a network access.

The video content may be captured by a mobile recording device, which may comprise, for example, a handset or a wearable device. The mobile recording device may be arranged, for example, around a wrist or neck of the user, for example as a watch or a bracelet. The mobile recording device may be also coupled with the user's head, for example, as a VR headset or smart glasses. The mobile recording device may be configured to record short and/or long term events. The mobile recording device may provide the video content to video server 108 or the video content may be locally captured by the mobile recording device such that it is locally available to the video controller 104 and/or the VR headset 102. According to an embodiment, the VR headset 102 may capture the video content. The recorded video content may be stored locally or remotely, for example, in a cloud that is accessible over a network.

Figure 2:
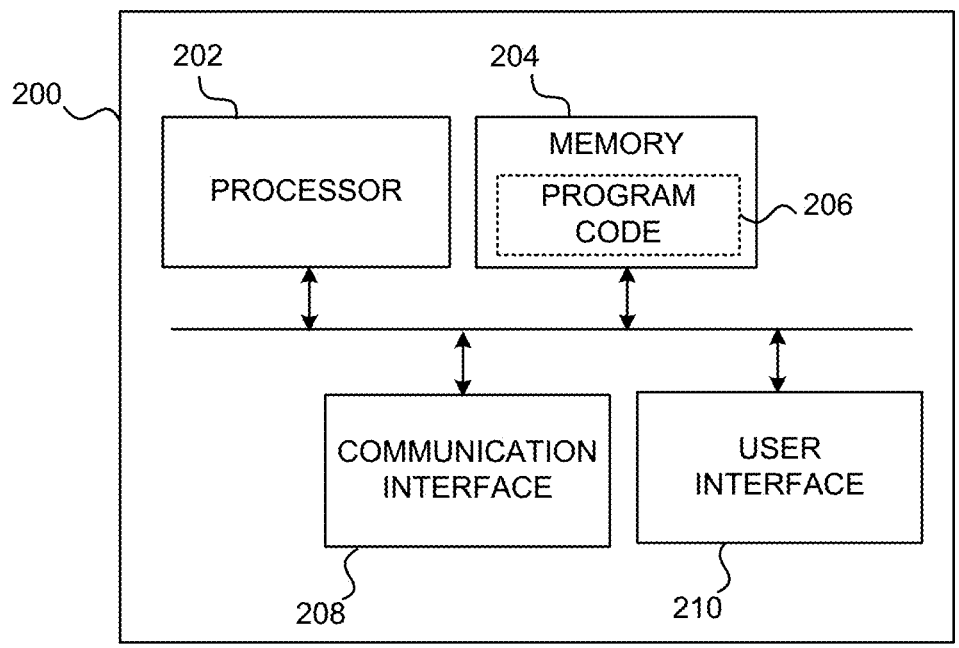
FIG. 2 illustrates an example of a device configured to practice one or more embodiments of the invention.

FIG. 2 illustrates an embodiment of a device 200, for example, a video device such as a VR headset 102, a video controller 104, or a video server 108, configured to practice one or more example embodiments. According to some embodiments, this device 200 may be configured as a media data preparation device 200. The device 200 may comprise at least one processor 202. The at least one processor 202 may comprise, for example, one or more of various processing devices, for example, a co-processor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The device 200 may further comprise at least one memory 204. The at least one memory 204 may be configured to store, for example, computer program code or the like, for example, operating system software and application software. The at least one memory 204 may comprise one or more volatile memory devices, one or more non-volatile memory devices, and/or a combination thereof. For example, the at least one memory 204 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The device 200 may further comprise a communication interface 208 configured to enable the device 200 to transmit and/or receive information. The communication interface 208 may be configured to provide at least one wireless radio connection, such as a 3GPP mobile broadband connection (e.g. 3G, 4G, 5G). Alternatively, or additionally, the communication interface 208 may be configured to provide one or more other type of connections, for example, a wireless local area network (WLAN) connection such as for example standardized by IEEE 802.11 series or Wi-Fi alliance; a short range wireless network connection, for example, a Bluetooth, NFC (near-field communication), or RFID connection; a wired connection, for example, a local area network (LAN) connection, a universal serial bus (USB) connection, a high-definition multimedia interface (HDMI), or an optical network connection; or a wired Internet connection. The communication interface 208 may comprise, or be configured to be coupled to, at least one antenna to transmit and/or receive radio frequency signals. One or more of the various types of connections may be also implemented as separate communication interfaces, which may be coupled to or configured to be coupled to a plurality of antennas.

The device 200 may further comprise a user interface 210 comprising or being configured to be coupled to an input device and/or an output device. The input device may take various forms such as for example a keyboard, a touch screen, and/or one or more embedded control buttons. The input device may further comprise a wireless control device such as for example a virtual reality hand controller. The output device may for example comprise at least one display, speaker, vibration motor, olfactory device, or the like.

When the device 200 is configured to implement some functionality, some component and/or components of the device 200, for example, the at least one processor and/or the memory, may be configured to implement this functionality. Furthermore, when the at least one processor is configured to implement some functionality, this functionality may be implemented using program code 206 comprised, for example, in the at least one memory 204.

The functionality described herein may be performed, at least in part, by one or more computer program product components such as software components. According to an embodiment, the device 200 comprises a processor or processor circuitry, such as for example a microcontroller, configured by the program code, when executed, to execute the embodiments of the operations and functionality described herein. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

The device 200 comprises means for performing at least one method described herein. In one example, the means comprises at least one processor and at least one memory including computer program code, the at least one memory and the computer code configured to, with the at least one processor, cause the device at least to perform the method.

Although the device 200 is illustrated as a single device it is appreciated that, wherever applicable, functions of the device 200 may be distributed to a plurality of devices, for example, to implement example embodiments as a cloud computing service.

Figure 3:
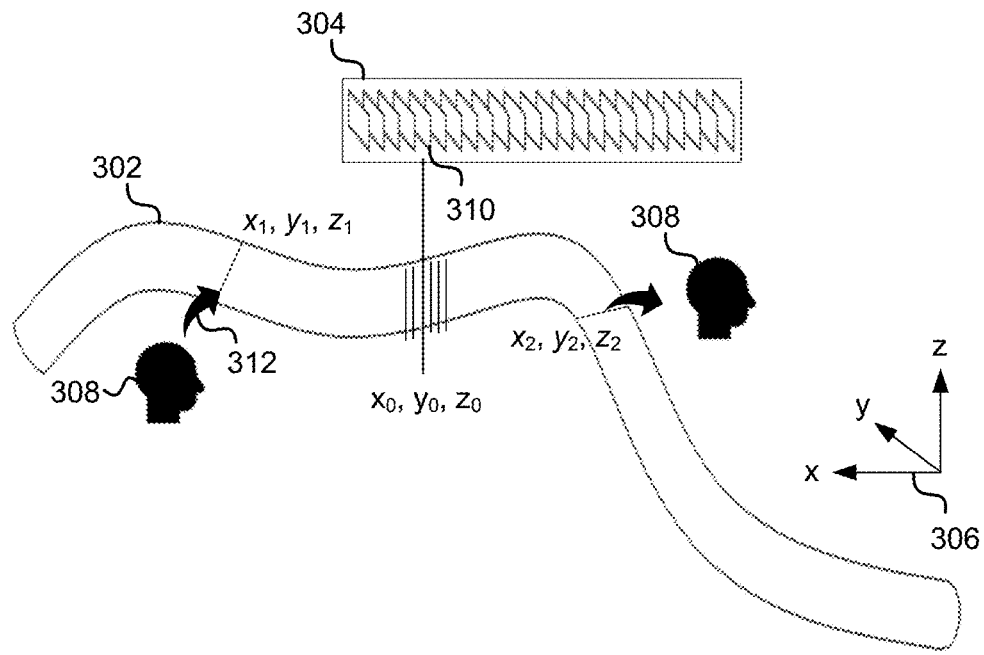
FIG. 3 illustrates an example of a video representation in a virtual reality space, according to an embodiment of the invention.

FIG. 3 illustrates an example of a video representation 302 in a virtual reality (VR) space, according to an embodiment of the invention. The VR space may be associated with a coordinate system such that locations within the VR space may be identified, for example with respect to three orthogonal axes 306 (x, y, z). Other coordinate systems may be alternatively used. The VR space may offer a 6DOF (six degrees-of-freedom) capability such that the user 308 may move in the VR space with respect to the video representation 302. Alternatively, the representation may be provided in other virtual reality formats, such as for example 3DOF, wherein the user 308 is enabled to observe the VR space from one location, or 3DOF+ where the user is additionally enabled to move his head.

The video representation 302 may be generated based on video content, for example, a plurality of video frames 304. A video frame may comprise a snapshot of the video data at a particular time instant. Depending on time resolution the video data may comprise different number of video frames per second, for example, 50 frames per second (fps). Portions of the video data may be associated with a set of metadata. The set of metadata may be based on at least one spatial coordinate. For example, the set of metadata may comprise at least one coordinate associated with capture of the video data. The set of metadata may be, for example, stored at the time of capturing the video data. According to an example embodiment, a subset of metadata may be associated with each video frame. For example, the set of metadata may comprise capture locations for each video frame. Even though embodiments are described using video data as an example, it is understood that embodiments may be applied to other types of media data, such as for example audio data and/or olfactory data with or without associated video data or image data.

The set of metadata may comprise location information such as for example coordinates, which may be associated with capturing at least one portion of the video data. The location information may comprise positioning system coordinates. The location information may be determined based on any suitable positioning system such as for example the global positioning system (GPS), Wi-Fi positioning, or the like. In general, the location information may comprise a plurality of locations associated with capture of media data.

Alternatively, or additionally, the set of metadata may comprise motion information, for example, a plurality of velocities associated with the capture of media data, for example, the video data. The plurality of velocities may be associated with different portions of video data, for example different video frames. The plurality of velocities may comprise a plurality of directions of motion and a corresponding plurality of speeds of motion. The motion information may be determined based on sensor data provided for example by one or more accelerometers, gyroscopes, and/or magnetometers embedded in or associated with the capture device. The motion information may therefore comprise gyroscope data and/or magnetometer data. The motion information may be also determined based on tracking location of the capture device.

Alternatively or additionally, the set of metadata may comprise time information associated with the media data, for example, a time stamp for each video frame, or a subset of video frames. The time information may comprise an absolute time such as for example a date and time in the coordinated universal time (UTC), or a relative time, for example with respect to the beginning of the video data.

The set of metadata associated with the video data may be used to provide the user 308 with a video representation 302 that reflects location information associated with the video data. The video representation 302 may comprise, for example, a tube that propagates in the VR space according to capturing locations of the video data. The length of the tube may reflect the time dimension. For example, the starting position of the tube in the VR space may correspond to the beginning of the video data and the ending position of the tube may correspond to the end of the video data. Hence, the four dimensions of the "timeless" universe may be advantageously presented to the user 308 in the VR space.

According to an embodiment, the video data may comprise a plurality of video frames 304. The set of metadata may comprise a plurality of subsets of metadata. Each video frame, or a subset of video frames, may be associated with a subset of metadata. For example, a video capture device may be configured to store a subset of metadata, for example a spatial location, every now and then, for example, periodically at certain time intervals, such that some video frames are associated with a subset of metadata and some video frames are not associated with a subset of metadata. The set of metadata may be stored within a video file, for example, as a metadata track, or the set of metadata may be stored separately.

The set of metadata associated with the video frames may be mapped to the coordinate system of the virtual space, such that a shape and/or location of the video representation 302 at the VR space may be determined. For example, video frame 310 may be associated with particular coordinates in the real world. The real world coordinates may be mapped to coordinates ($x_o$, $y_o$, $z_o$) of the VR space. The representation 302 may be therefore determined to pass point ($x_o$, $y_o$, $z_o$) in the VR space.

Figure 4:
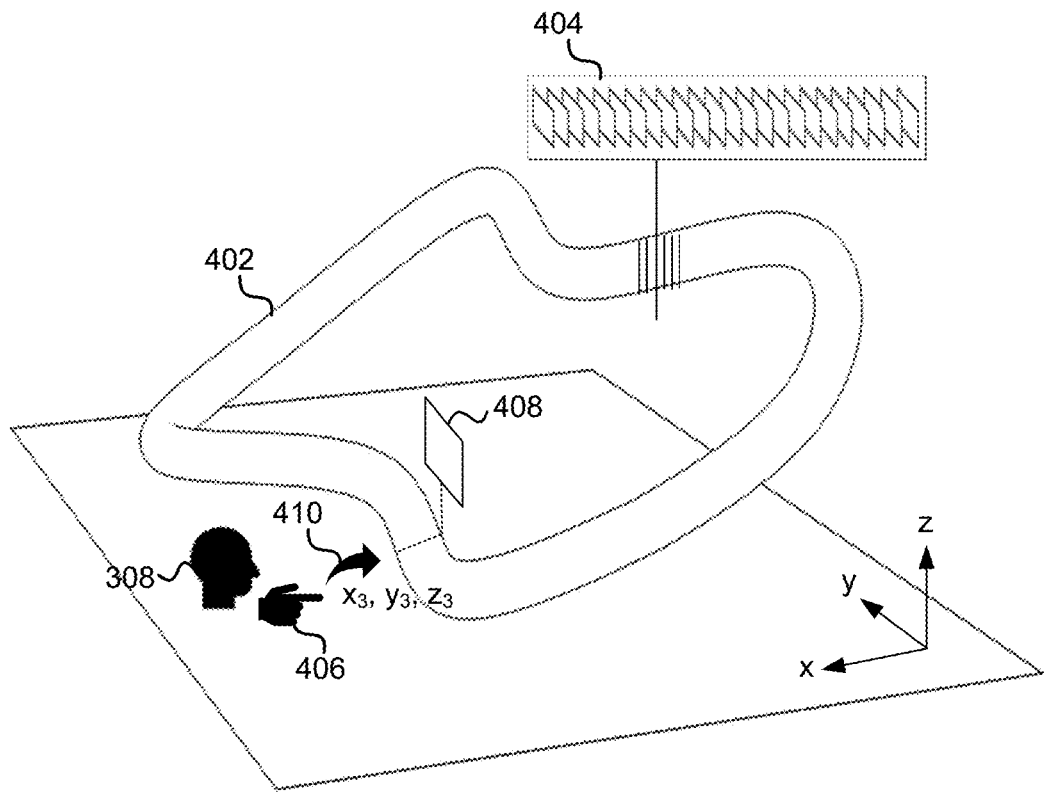
FIG. 4 illustrates another example of a video representation in a virtual reality space, according to an embodiment of the invention.

FIG. 4 illustrates another example of a video representation 402 in a virtual reality space, according to an embodiment of the invention. The video representation 402 may represent video data, for example, a plurality of video frames 404, of a roller coaster ride such that multiple rounds of the roller coaster ride form a closed tube in the VR space. Hence, the location information based video representation 402 provides an informative representation of the video data to the user 308.

With respect to FIG. 3 and FIG. 4, it is noted that the user 308 may access the video data, for example, the plurality of video frames 304, 404, or interact with the video representations 302, 402 in the VR space with various user inputs such as a diving gesture 312 or pointing gesture 410, as will be further described below.

Figure 5:
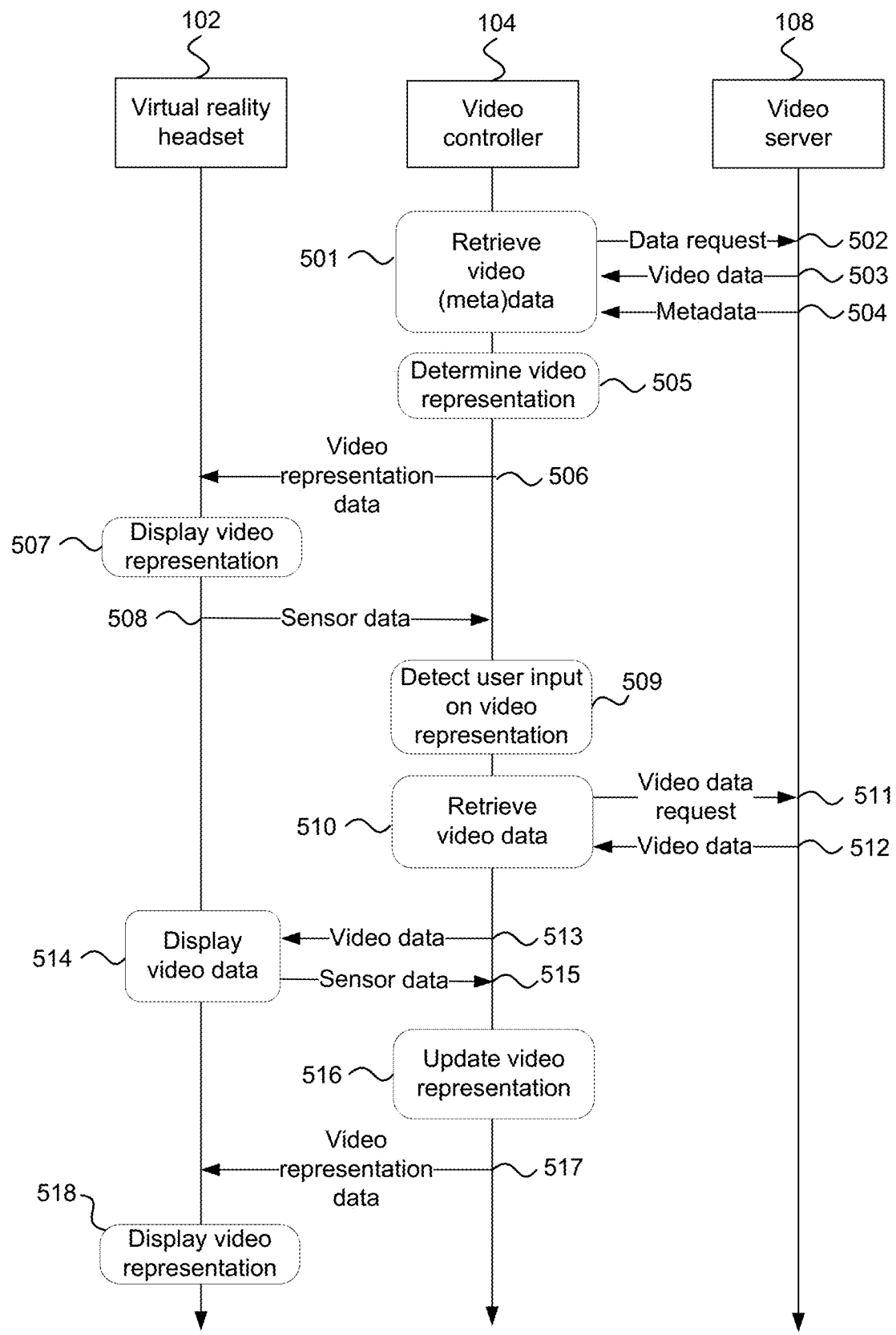
FIG. 5 illustrates an example of determining and providing a video representation, according to an embodiment of the invention.

FIG. 5 illustrates an example of determining and providing a video representation, according to an embodiment of the invention. Different operations have been illustrated as being performed by the VR headset 102, the video controller 104, and the video server 108. It is however appreciated that operations may be performed by any suitable device(s) or function(s) of a video system. Similar representation may be also provided for other type of media, such as for example audio or image data, or multimedia content.

At 501, the video controller 104 may retrieve video data and/or a set of metadata for providing a representation of the video data in a VR space. The video data and/or metadata may be received from a local memory, for example an internal memory of the video controller 104, or an external local memory device such as for example an external hard drive. The video data may comprise a plurality of video frames. The metadata may be associated with the video data. The metadata may comprise spatial metadata, for example, spatial information such as location and/or motion associated with at least one portion of the video data. The metadata may further comprise temporal metadata, such as for example time information, e.g. time stamp(s), associated with at least one portion of the video data. The portion of the video data may comprise one or a plurality of video frames.

Alternatively, the video data and/or metadata may be received from the video server 108, for example, over the network 106. For example, at 502 the video controller 104 may send a data request to the video server 108. The request may comprise one or more identifiers of the data and/or one or more conditions for providing the data. For example, the data request may indicate one or more users, one or more geographical zones, one or more time periods, or the like, for example as condition(s) for providing the data. The data request may indicate whether the video controller 104 requests video data, metadata, or both video and metadata.

The data request may indicate that the video data is requested for the purpose of providing a video representation. This enables to reduce the amount of data transfer between video controller 104 and video server 108. For example, in response to receiving such indication, the video server 108 may provide information necessary for generating a video representation. The video server 108 may, for example, provide the metadata without video data or the metadata with a subset of video data. According to an embodiment, the video controller 104 may explicitly request the metadata and/or a subset of the video data. Where applicable, similar condition(s) or requests may be applied also when retrieving the video data from a local memory.

At 503, the video controller 104 may receive the video data from the video server 108.

At 504, the video controller 104 may receive the set of metadata from the video server 108.

The video data and the metadata may be received in separate files or streams. Alternatively, the metadata may be provided along with the video data, or a subset thereof, for example as a metadata track. In general, the video controller 104 may receive a set of metadata that is based on at least one spatial coordinate, wherein the set of metadata is associated with the media data. The media data may comprise a plurality of video frames, wherein a subset of the set of metadata may correspond to each of the plurality of video frames.

At 505, the video controller 104 may determine at least one representation of the video data in the VR space based on the set of metadata. The video representation may be determined such that the shape and/or location of the video representation in the VR space reflects location information associated with the video data. In general, the video controller 104 may determine a representation of the media data in a virtual reality space based on the set of metadata. Determining the representation of the media data may comprise mapping the set of metadata to at least one location in the virtual reality space. The set of metadata may comprise at least one of location information, motion information and time information associated with the media data.

The location information, for example at least one real-world coordinate, may be mapped to the VR space directly or the location of the video representation in the VR space may be determined based on a transformation of the location information. For example, locations of the video representation in the VR space may be scaled, for example, such that movements during video capture are magnified or attenuated. The video representation may be further determined based on time information associated with capture of the media data. Time information may be for example used to modify the video representation such that events associated with different time instants or periods are represented at different locations in the VR space. According to an embodiment, the length of the video representation in the VR space may be determined based on a duration of the video data. The video representation may comprise various geometrical shapes such as for example geometrical line(s), spline(s), or tube(s) and/or branch(es) of geometrical line(s), spline(s), or tube(s). The video controller 104 may further generate the video representation data in a format suitable for displaying at the VR headset 102.

At 506, the video controller 104 may send the video representation data to the VR headset 102.

At 507, the VR headset 102 may display the video representation. The user may experience the video representation in the VR space. For example, the user may observe how the video content propagates in the VR space with respect to time.

At 508, the VR headset 102 may send sensor data to the video controller 104. The VR headset 102 may be embedded with sensors that enable tracking a current viewport of the user. A viewport may comprise a portion of the VR space visible to the user through the VR headset 102 at a time. The current viewport may be tracked based on location and/or direction of the VR headset 102, such that the portion of the VR space corresponding to user's current viewing direction may be rendered. The user may further be enabled to move with respect to the video representation and thereby observe the video representation from different viewing points.

The video controller 104 may receive the sensor data from the VR headset 102. Based on the received sensor data the video controller 104 may send video, image, and/or audio data corresponding to the current viewport to the VR headset 102. The sensor data may further comprise user input related data, for example location(s) of user's body parts such as hands, or location(s) VR controllers in the VR space, actuation of buttons embedded in the VR headset 102 or associated VR controllers, or the like.

At 509, the video controller 104 may detect a user input at a particular location of the video representation in the VR space. Detecting a user input at the video representation may in general comprise detecting a body part or a virtual reality (VR) controller to coincide with the video representation in the VR space. The video controller 104 may be configured to track location of the user based on sensors attached to different body parts of the user, based on VR controllers carried by the user, and/or based on location of the VR headset 102. For example, the video controller 104 may be configured to track the location of the user's head, hand(s), or finger(s) to detect a gesture at a particular location of the video representation. The video controller 104 may be configured to perform at least one operation on the video representation or the video data based on detecting user input at the particular location. A VR controller may comprise a control device configured to be carried by the user. The VR controller may for example comprise a hand controller. The VR controller may be communicatively coupled with the VR headset 102 and/or the video controller 104, for example to send sensor data associated with the VR controller.

In general, the video controller 104 may be configured to detect a user input at a first location of the representation of the media data in the virtual reality space and perform an operation associated with the media data based on the first location. Detecting the user input may comprise detecting a body part of the user or a virtual reality controller to coincide with the representation of the media data in the virtual reality space at the first location. Detecting the user input may comprise detecting a head of the user to coincide with the representation of the media data in the virtual reality space at the first location, wherein a position of the head of the user may be tracked based on at least one sensor associated with a virtual reality headset. The operation may comprise at least one of: initiating a playback of the media data from a portion of the media data associated with the first location, providing a preview of a portion of the media data associated with the first location, and editing the representation of the media data.

Referring to FIG. 3, the user may be for example detected to perform a diving gesture 312 to the video representation 302 at a first location ($x_1$, $y_1$, $z_1$). Detecting the diving gesture may comprise detecting user's head or the VR headset 102 to coincide with the video representation 302 at the first location ($x_1$, $y_1$, $z_1$) in the VR space. The position of the head of the user may be tracked for example based on at least one sensor associated with the VR headset 102. The video controller 104 may be configured to perform an operation in response to detecting the diving gesture at the first location ($x_1$, $y_1$, $z_1$). The operation may comprise initiating a video playback from a portion of the video data corresponding to the first location ($x_1$, $y_1$, $z_1$). For example, the video controller 104 may be configured to determine which video frame of the plurality of video frames 304 corresponds to the first location ($x_1$, $y_1$, $z_1$). In response to detecting the diving gesture, or another predetermined gesture, the video controller 104 may determine to initiate video playback from this frame.

At 510, the video controller 104 may retrieve the video data, for example in response to the detected user input at the first location ($x_1$, $y_1$, $z_1$) in the VR space. The video controller 104 may retrieve the video data, for example video frames starting from the video frame corresponding to the first location ($x_1$, $y_1$, $z_1$), from its internal memory. The video controller 104 may have retrieved or received necessary video content for initiating the video playback already at operation 503. Alternatively, or additionally, the video controller 104 may retrieve video data from the video server 108. For example, at 511 the video controller 104 may send a video data request to the video server 108. The video data request may comprise an indication of the video frame corresponding to the first location ($x_1$, $y_1$, $z_1$) in the VR space. At 512, the video controller 104 may receive the requested video data from the video server 108.

At 513, the video controller 104 may send the video data to the VR headset 102. At 514, the VR headset 102 may display the video data. At 515, the VR headset 102 may send sensor data to the video controller 104. It is noted that even if single operations of retrieving the video data 510, sending the video data 513, displaying the video data 514, and sending the sensor data 515 are illustrated in FIG. 5, providing the video data to the user may comprise continuous data streaming from the video controller 104 and/or video server 108 to the VR headset 102, where portions of the video data are provided based on sensor data, for example viewing direction and/or location, reported by VR headset 102.

The video data may comprise three-dimensional video data or two-dimensional video data. Regardless of the type of video, the video data may be rendered to the user using the VR headset 102. For example, with reference to FIG. 3, if the video data is three-dimensional (3D), the video controller 104 may replace the 3D video representation 302 with the 3D video data. If the video data is two-dimensional (2D), the video controller 104 may replace the 3D video representation 302 with a projection of the 2D video in the VR space, or supplement the 3D video representation 302 with a projection of the 2D video data in the VR space. For example, the 2D video may be displayed on a 2D surface in the VR space.

As discussed above, while displaying the video data at 514, the VR headset 102 may report sensor data to the video controller 104. In addition to sensor data indicating user's viewing direction and/or location the sensor data may comprise user input data indicating a request to terminate video playback. The video controller 104 may be configured to terminate video playback, for example in response to receiving such request or when reaching end of the video data.

At 516, the video controller 104 may be configured to update the video representation. For example, when terminating video playback, the video controller 104 may be configured to determine a second location in the VR space corresponding to the last played video frame. The video representation may be then rendered based on the location corresponding to the last played video frame in the VR space.

At 517, the video controller 104 may send the updated video representation data to the VR headset 102.

At 518, the VR headset 102 may display the updated video representation.

For example, with reference to FIG. 3 sensor data associated with a user input indicating a request to terminate video playback may be received at a video frame corresponding to the second location $(x_2, y_2, z_2)$ in the VR space. In response to the user input, the video controller 104 may render the video representation 302 based on the second location $(x_2, y_2, z_2)$, for example such that the user is located at or near the second location $(x_2, y_2, z_2)$ in the VR space. If the user does not terminate video playback, the last played video frame may be determined to correspond to the last video frame of the video data, and the video representation may be rendered based on the end location of the video representation. Therefore, the embodiments provide an intuitive user interface for accessing media data in a VR space. The user may be, for example, enabled to dive in a video tube in a VR space. At the end of video playback the user pops out of the tube either at the end of the tube or at the point of terminating video playback.

With reference to FIG. 4, the user may be enabled to perform a gesture 410 with a body part, for example, a hand 406, or a VR controller. The gesture may comprise any suitable gesture associated with the video representation 402, for example, a pointing gesture, a slashing gesture, a grabbing gesture, a dragging gesture, a wiping gesture, or the like. Different gestures 410 may be associated with different operations. For example, a pointing gesture may be associated with providing a preview 408 of the video data in the VR space.

According to an embodiment, the video controller 104 may be configured to receive sensor data at 508, detect a pointing gesture at location $(x_3, y_3, z_3)$ at 509, and/or update the video representation with a preview 408 at 516. The video controller 104 may for example determine which video frame of the plurality of video frames 404 corresponds to the detected pointing location $(x_3, y_3, z_3)$. The video controller 104 may provide the preview 408 based on this video frame. The preview 408 may comprise a preview frame or a preview video. The preview 408 may be provided for example on a two-dimensional surface in the VR space. Optionally video data related to the update, for example the preview, may be retrieved at 510. The video controller 104 may determine to initiate video playback automatically or based on a subsequent user input. For example, the pointing gesture 410 may be followed by a diving gesture 312 to initiate video playback based on the pointing location or the subsequent diving location.

Figure 6:
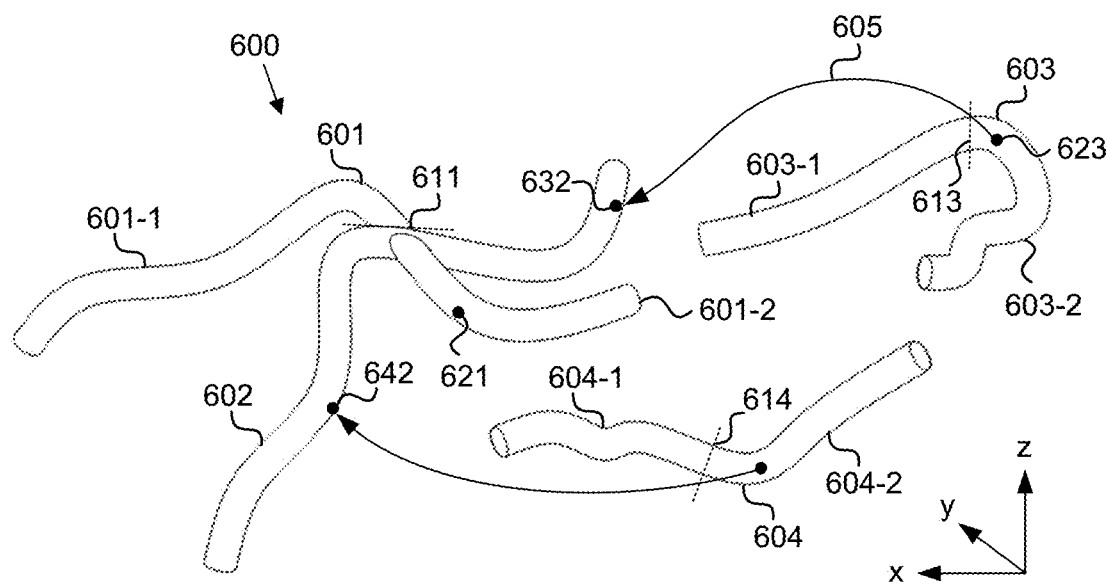
FIG. 6 illustrates an example of editing a video representation, according to an embodiment of the invention.

FIG. 6 illustrates an example of editing a video representation 600, according to an embodiment of the invention. The video representation 600 may comprise video representations 601 (comprising portions 601-1 and 601-2), 602, 603 (603-1 and 603-2), and 604 (604-1 and 604-2). It is however understood that in general the video representation 600 may comprise representations of one or more video clips, files, or portions of video data. As illustrated in FIG. 6, video representations 601 and 602 may intersect in the VR space. In general, a representation of media data may comprise a first representation of first media data and a second representation of second media data. The first representation and the second representation may intersect in the VR space.

As discussed in connection to FIG. 5, a user input may be detected at the operation 509. An operation associated with the user input may be performed in response to detecting the user input. The operation may, for example, comprise updating the video representation at 516. A user may be for example enabled to edit the video representation.

In the example of FIG. 6, the video controller 104 may receive sensor data from VR headset 102, at least one sensor associated with the VR headset 102 or the user, or a VR controller. Based on the received sensor data, the video controller 104 may detect a user input at location 611, which may be, for example, at the intersection of video representations 601 and 602. The user input may be associated with an operation of cutting the video representation at location 611. According to an embodiment, the user input may comprise a predetermined gesture such as for example a slashing gesture. In response to detecting the gesture, the video controller 104 may divide video representation 601 into a first portion 601-1 and a second portion 601-2. The video Subsequently, the video controller 104 may detect a user input at location 621, which may be located at the second portion 601-2. The user input may be associated with an operation of deleting the associated portion of the video representation. According to an embodiment, the user input may comprise a predetermined gesture such as for example a wiping gesture.

The video controller 104 may further detect a user input associated with a cutting operation at locations 613 and 614 corresponding to video representations 603 and 604. Accordingly, the video representations 603 and 604 may be divided into first portions 603-1, 604-1 and second portions 603-2, 604-2. The video controller 104 may further detect a user input or inputs associated with deleting the first portions of video representations 603-1 and 604-1, for example wiping gesture(s).

The video controller 104 may further detect a user input or inputs associated with an operation of repositioning the second portion 603-2. According to an embodiment, the user input may comprise a predetermined gesture such as for example a dragging gesture along a trajectory 605. The dragging gesture may be distinguished from the wiping gesture for example based on a speed of movement being below a threshold, finger positions, and/or finger movements. According to an embodiment, the user input may further comprise a predetermined gesture such as for example a dropping gesture at a location 632. The dropping gesture may be detected for example based on finger movements during a dragging gesture. As a result, the second portion 603-2 may be repositioned at a location 632. Similar repositioning operation may be performed for the second portion 604-2 of video representation 604, which may be repositioned at a location 642.

Figure 7:
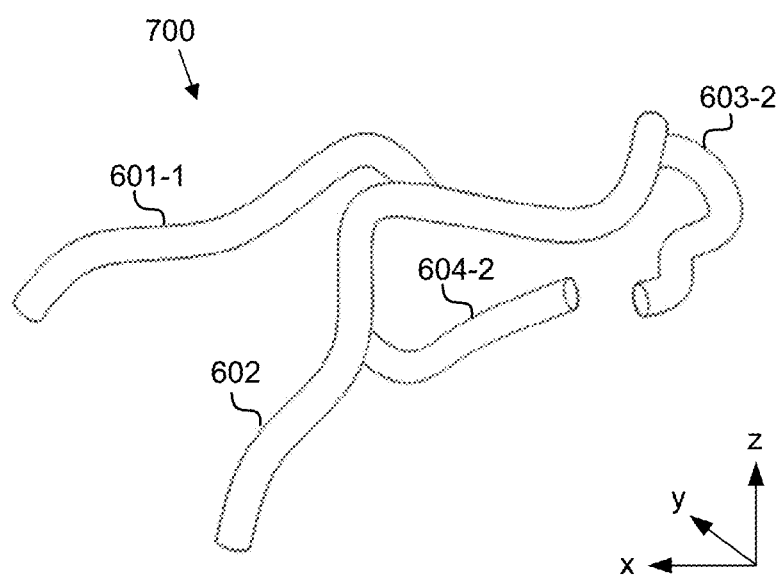
FIG. 7 illustrates an example of an edited video representation, according to an embodiment of the invention.

FIG. 7 illustrates an example of an edited video representation 700, according to an embodiment of the invention. The video representation 700 may be obtained based on the user inputs and operations associated with video representation 600. In response to detecting the user input(s), the video controller 104 may update the video representation accordingly, at 516. The edited video representation 700 may comprise the first portion 601-1 of video representation 601, the second video representation 602, and the repositioned second portions 603-2 and 604-2 of video representations 603 and 604.

FIG. 6 and FIG. 7 illustrate an example of enabling a user to interact with video representations. For example, user may combine different video clips such that desired video content will be displayed to the user during video playback. Embodiments also enable creating different storytelling options. For example, when playing a video clip associated with the video representation 602 and reaching the video frame corresponding to location 642, the user may be provided with options to continue with the video representation 602 or to enter the second portion 604-2 of the video representation 604.

Figure 8:
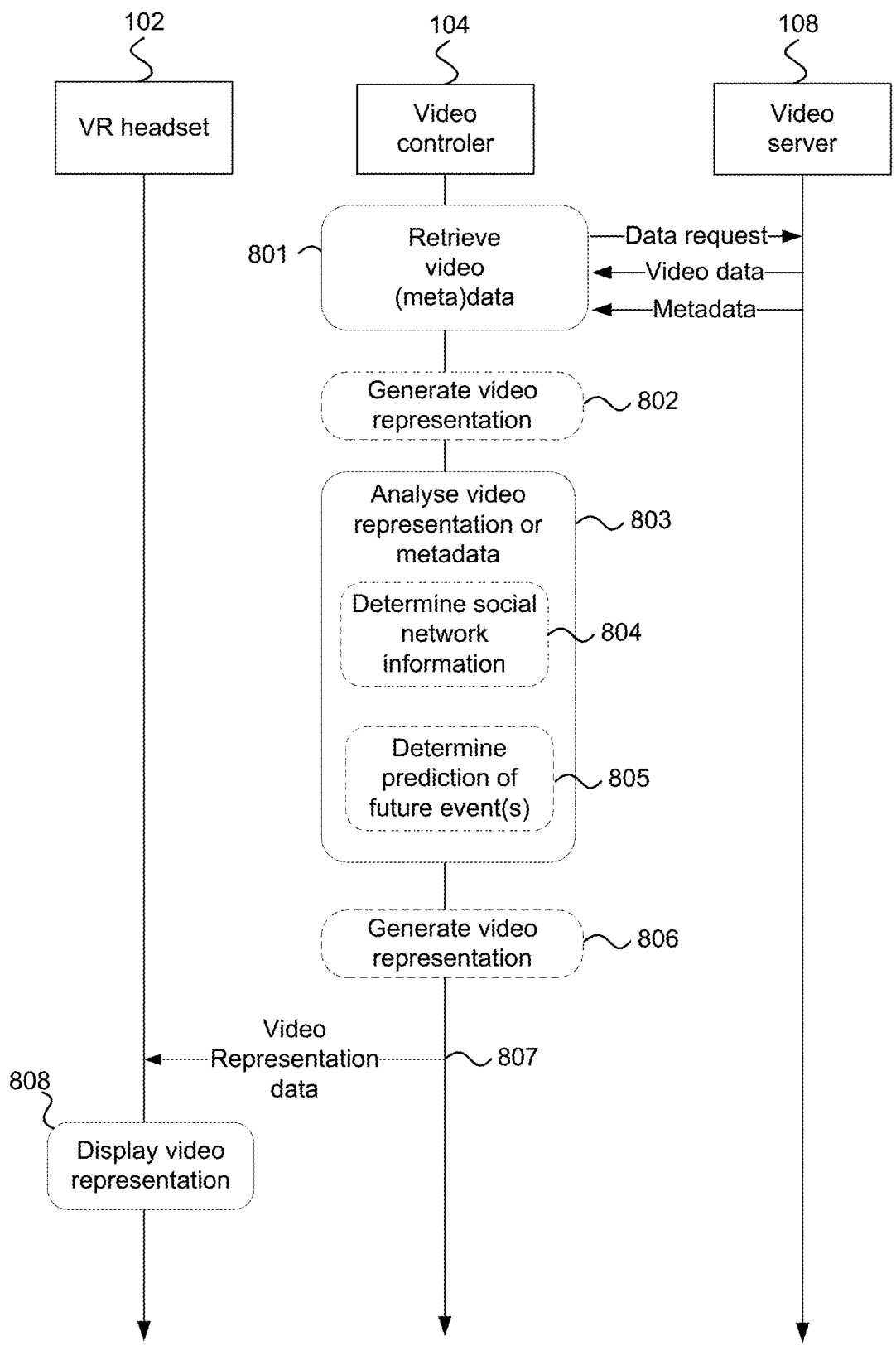
FIG. 8 illustrates an example of analyzing a video representation or metadata, according to an embodiment of the invention.

FIG. 8 illustrates an example of analyzing a video representation or metadata, according to an embodiment of the invention. Different operations have been illustrated as being performed by the VR headset 102, the video controller 104, and the video server 108. It is however appreciated that operations may be performed by any suitable device(s) or function(s) of a video system. Similar representation may be also provided for other type of media, such as for example audio or image data, or multimedia content.

At 801, the video controller 104 may be configured to retrieve video data and/or a set of metadata similar to the operation 501. Retrieving the video data and/or metadata may comprise, for example, receiving the data from a local memory or requesting the video data and/or metadata from video server 108. The video controller 104 may be configured to generate a video representation at 802 and analyze the video representation at 803. Alternatively, or additionally, the video controller 104 may be configured to analyze the metadata at 803 and to generate the video representation at 806. Therefore, the analysis at 803 may be based on the metadata and/or the video representation.

At 807, the video controller 104 may send the video representation data to the VR headset 102, similar to operation 506.

At 808, the VR headset 102 may display the video representation, similar to operation 507.

Figure 9:
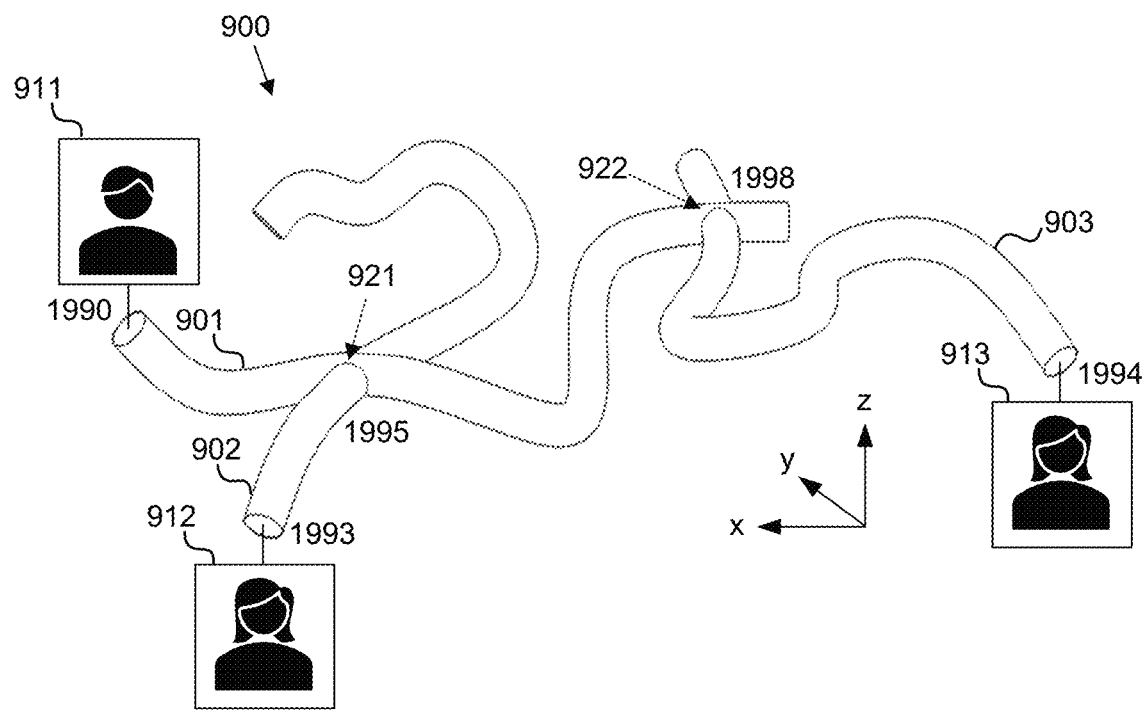
FIG. 9 illustrates an example of analyzing video representations associated with different users, according to an embodiment of the invention.

FIG. 9 illustrates an example of analyzing video representations associated with different users, according to an embodiment of the invention. The video representation 900 may comprise video representations 901, 902, and 903 associated with users 911, 912, and 913, respectively. For example, the video representation 901 may have been captured by user 911, or the user 911 may be otherwise associated with video representation, for example by being present in the video data represented by the video representation 901. The beginning of the video data may correspond to a point in time, for example year 1990. Similarly, users 912 and 913 may be associated with the video representations 902 and 903, respectively, the starting positions of the video representations corresponding to years 1993 and 1994.

At 803, the video controller 104 may analyze the video representation 900. For example, the video controller 104 may determine that the video representations 901 and 902 intersect in the VR space at location 921. At 804, the video controller 104 may determine social network information based on the video representation, for example based on the detected intersection of the video representations 901 and 902. The video controller 104 may use metadata associated with the underlying video data to provide social network connection data. The social network connection data may for example comprise an association between the users 911 and 912 and/or contextual metadata associated with the encounter. The contextual metadata may for example comprise a time of the encounter, for example year 1995, a location of the encounter, or other information related to the encounter.

Alternatively, or additionally, at 804 the video controller 104 may determine social network information based on the location information associated with the video data. This may be done without generating the video representation at 804. For example, the video controller 104 may compare the location information and/or time information associated with the video data represented by the video representations 901 and 903 and determine that these video representations would intersect at location 922 in the VR space. The video controller 104 may further determine that the encounter has happened in 1998. Based on the detected intersection, the video controller 104 may determine social network information as described above. Subsequently, a video representation illustrating this encounter may be generated at 806.

In general, the video controller 104 may be configured to determine social network information based on the representation of the media data and/or the set of metadata, or receive social network information associated with the media data and determine the representation of the media data based on the social network information and the set of metadata.

Figure 10:
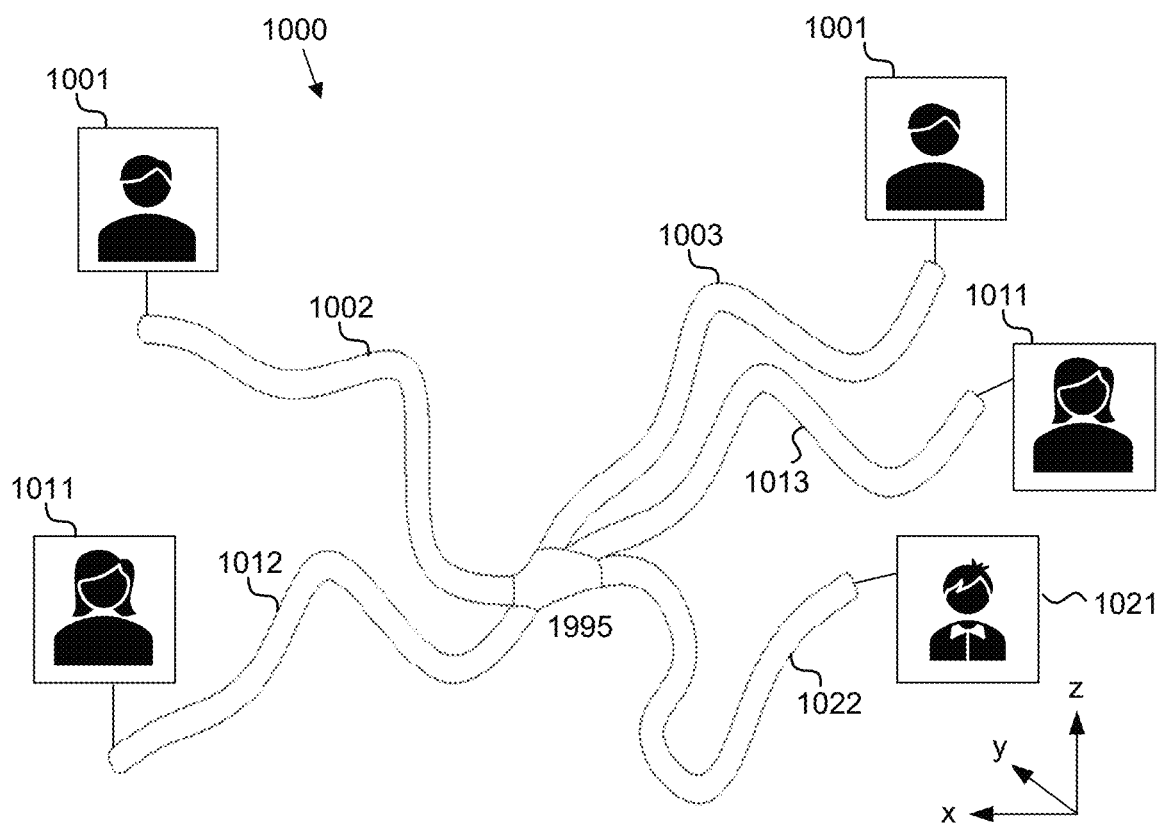
FIG. 10 illustrates an example of a video representation determined based on social network information, according to an embodiment of the invention.

FIG. 10 illustrates an example of a video representation 1000 determined based on social network information, according to an embodiment of the invention. The video representation 1000 may comprise video representations 1002 and 1003 associated with user 1001, video representations 1012 and 1013 associated with user 1011, and/or video representation 1022 associated with user 1021.

As discussed above, at operation 801 the video controller 104 may retrieve video data and/or a set of metadata associated with the video data, for example the location information. The video controller 104 may further receive social network information associated with the video data, or at least one portion of the video data. The social network information may be for example requested from the video server 108, or another server. Alternatively, the social network information may be retrieved from a local memory. The social network information may comprise associations between users and/or a type of relation between users.

According to an embodiment, the video controller 104 may determine the representation of the video data based on the social network information and the set of metadata. For example, the video controller 104 may receive social network information indicating that user 1001 has a son 1021 with user 1011. Based on this social network information the video controller 104 may determine a video representation where lives of users 1001, 1011, and 1021, are intuitively illustrated in the VR space. For example, users may have met in 1995 and the son 1021 may have born in the same year. Accordingly, the video representations of users 1001 and 1011 may intersect at a point corresponding to year 1005, and the video representation of son 1021 may begin at this point. It is noted that even though video presentations may be generated based on location information included in the set of metadata, various methods may be applied to avoid excessive overlapping of video representations. For example, spatial offsets or magnifications of spatial differences between locations indicated in the set of metadata may be used to provide the user with a clearer overall video representation in the VR space.

Figure 11:
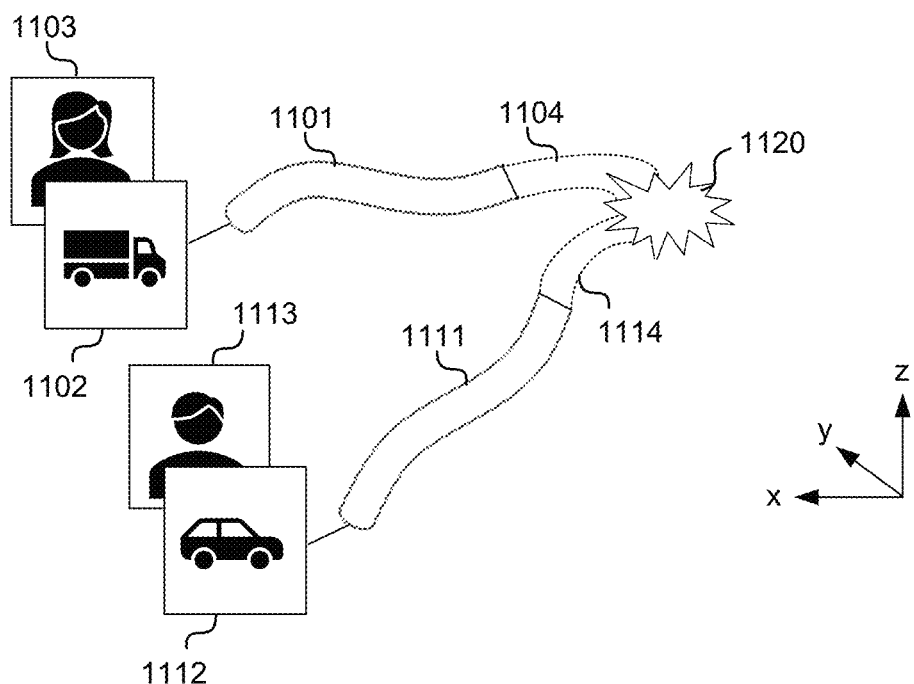
FIG. 11 illustrates an example of predicting a future event based on video representations, according to an embodiment of the invention.

FIG. 11 illustrates an example of predicting a future event based on video representations, according to an embodiment of the invention. At 801, the video controller 104 may receive contextual set of metadata associated with at least one portion of video data. Contextual metadata may for example comprise personal information such as for example smoking habits, eating habits, driving habits, hobbies or other activities of the user, and/or speed, location, or weather associated with the video data. Contextual metadata may comprise information about objects associated with the video data, for example, specifications of a car. The contextual metadata may therefore comprise information about the environment where the at least one portion of the video data has been or is being captured. At 801, the video controller 104 may further receive location information, as described above.

At an operation 802, the video controller 104 may generate video representations 1101 and 1111. These video representations may be associated, for example, with a truck 1102 and a car 1112, respectively. At 805, the video controller 104 may determine a prediction of at least one event 1120 based on the contextual set of metadata and/or the set of metadata. In this example, the contextual metadata may comprise an indication that the user is driving a car, an indication of weather conditions, traffic conditions, or the like. The set of metadata may comprise spatial information such as for example speed, direction, and/or location of the vehicle. In this example, the predicted event may comprise a collision between the truck 1102 and the car 1112. In response to determining the prediction of the event, the video controller 104 may send a notification of the predicted event to users 1103 and/or 1113, for example in order to prevent an unfavorable event such as a collision.

The prediction of the event 1120 may be determined based on detecting an intersection of estimated extensions 1104, 1114 of video representations 1101, 1111. For example, the spatial information associated with each video data may be extrapolated to determine locations of the extensions 1104, 1114, and thereby also their intersection.

In another example, the predicted event 1120 may comprise an unpleasant encounter or relationship between users 1103 and 1113 (without reference to vehicles 1102, 1112). The contextual metadata may comprise information about the users 1103 and 1113, for example their living habits, values, or demographic information such as ages of the users 1103 and 1113. Based on the contextual metadata, the video controller 104 may determine whether an encounter or relationship between users 1103 and 1113 is likely to be negative or positive. The video controller 104 may provide a notification to users 1103 and/or 1113 accordingly.

In general, the video controller 104 may be configured to receive contextual set of metadata associated with the media data and determine a prediction of at least one event based on the contextual set of metadata and/or the set of metadata.

The video controller 104, or another device or function, may comprise artificial intelligence (AI) for determining the prediction of the event 1120. The AI may be implemented for example as a machine learning model such as a neural network. During training, the neural network may be provided with one or more video representations with associated spatial information and contextual metadata. The contextual metadata may be stored automatically during video capture, or the user may be enabled to store any relevant information manually. The user may be further requested to label certain events, such as encounters with a particular people, as favorable or unfavorable.

Based on the labeled training data the neural network may be trained to predict favorable or unfavorable events. During inference phase, the network may be provided with one or more video representations and the network may output an estimation of whether a favorable or unfavorable event is expected based on the available video data, contextual metadata, and/or spatial information. The video controller 104 may be configured to update the video representation(s) with a notification of the predicted event and to send the updated video representation to the VR headset 102 for displaying to the user.

Based on the analysis by artificial intelligence such as the neural network, the data gathered by millions of users may be used to predict future event(s) and to provide life guidance for a particular user, for example in terms of health, finance, and/or socializing. As described above, the prediction may be based on statistics of similar users. For example, the following guidance may be provided to the user: "By eating this food and sleeping this much affects to your lifetime by this amount" or "By marrying this type of woman (with certain lifetime behavior) is/is not a good choice."

Figure 12:
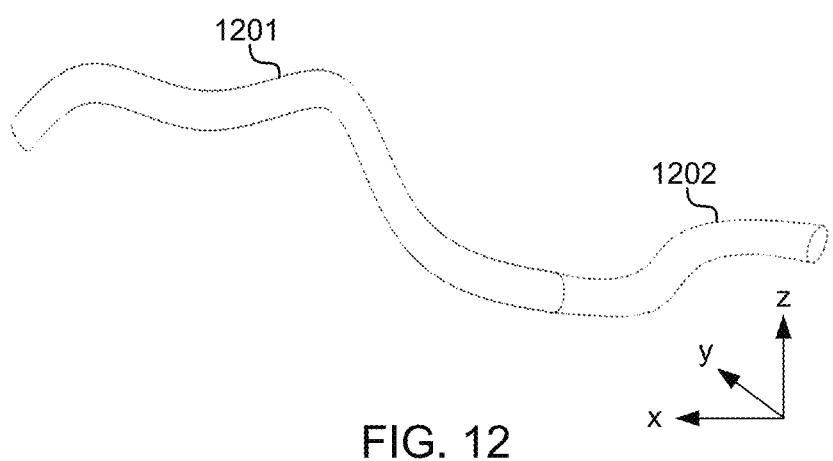
FIG. 12 illustrates an example of an extended video representation based on prediction of at least one future event, according to an embodiment of the invention.

FIG. 12 illustrates an example of providing an extended video representation based on prediction of at least one future event, according to an embodiment of the invention. The video representation may comprise a first portion 1201 determined based on available video data, set of metadata, and/or contextual set of metadata. A second portion 1202 may be generated based on at least one predicted event. The shape of the second portion 1202 may be determined based on an estimation of future location data. The length of the second portion may be determined based on an estimated time for the last predicted event. The shape of the video representation may be alternatively determined without estimating future location data, for example randomly, while the length of the video representation may be determined based on an estimated time for the last predicted event.

According to an embodiment, the length of the second portion 1202 may be determined based on an estimate of remaining lifetime of a user associated with the first portion 1201. The remaining lifetime may be estimated by artificial intelligence, such as for example a neural network, based on various contextual metadata, as described above. The contextual metadata may comprise lifestyle data. The lifestyle data may comprise, for example, nutrition, stress, blood analysis, exercise, illness, smoking, alcohol usage, and/or medical treatment related data. Using the contextual metadata as an input, an expected lifetime estimation may be performed by the neural network. Lifetime estimation, and thereby the length of the second portion 1202, may be therefore dependent on analyzed beneficial or harmful lifestyle factors.

Figure 13:
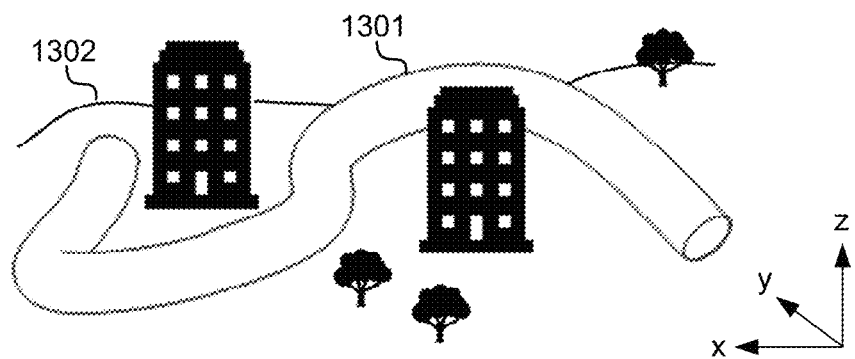
FIG. 13 illustrates an example of a video representation overlaid on geographical content, according to an embodiment of the invention.

FIG. 13 illustrates an example of a video representation 1301 overlaid on geographical content, according to an embodiment of the invention. The geographical content may comprise a map, an image, and/or a video of a geographical location. The geographical content may be two-dimensional or three-dimensional. For example, the geographical content may comprise a perspective view comprising two-dimensional and/or three-dimensional objects. The geographical content may for example comprise a three-dimensional map view.

In the example of FIG. 13, the geographical content comprises a landscape view 1302. The video representation 1301 may be overlaid or augmented on the landscape view 1202 for example such that capture locations of the video content are observable by the user with respect to the landscape view 1302 in the VR space.

According to an example embodiment, a video representation may be overlaid on a real-world view, for example by means of an augmented reality headset. For example, the video controller 104 may use the set of metadata, for example real-world coordinates, to determine location and shape of the video representation in an augmented reality space. For example, a location of rendering the video representation at the augmented reality headset may be determined such that the video representation is augmented on top of the real-world capture location.

Figure 14:
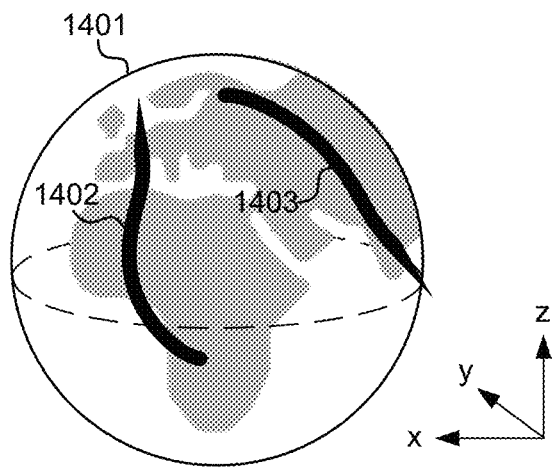
FIG. 14 illustrates another example of a video representation overlaid on geographical content, according to an embodiment of the invention.

FIG. 14 illustrates another example of a video representation overlaid on geographical content, according to an embodiment of the invention. In this example, the geographical content comprises a three-dimensional illustration of the globe 1401. Video representations 1402 and 1403 may be overlaid on the globe 1401 based on location information with the video data. For example, the location information included in the set of metadata may be mapped to corresponding coordinates at the VR space such that the video representation reflects the locations of video capture. The video representations 1402 and 1403 may be, for example, associated with two intercontinental flights.

Figure 15:
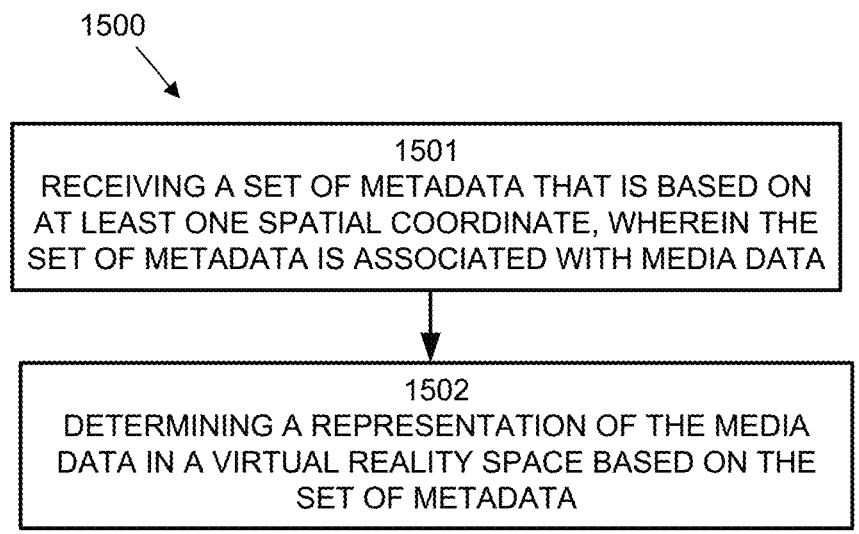
FIG. 15 illustrates an example of a method for preparing media data, according to an embodiment of the invention.

FIG. 15 illustrates an example of a method 1500 for preparing media data.

At 1500, the method may comprise receiving a set of metadata that is based on at least one spatial coordinate, wherein the set of metadata is associated with media data.

At 1501, the method may comprise determining a representation of the media data in a virtual reality space based on the set of metadata.

Further features of the method directly result from the functionalities and parameters of the video controller 104, VR headset 102, or in general a media data preparation device 200, as described in the appended claims and throughout the specification, and are therefore not repeated here.

Various example embodiments disclose methods, computer programs and devices for generating video representations in a virtual reality space and interacting with video representations in the virtual reality space. Example embodiments improve user experience for example when accessing or editing videos. Taking into account the location information and/or contextual metadata enables to visualize also predictions of future events in an informative manner.

A device, for example, a mobile phone, virtual reality headset, a video player or other virtual reality capable device, may be configured to perform or cause performance of any aspect of the method(s) described herein. Further, a computer program may comprise instructions for causing, when executed, a device to perform any aspect of the method(s) described herein. Further, a device may comprise means for performing any aspect of the method(s) described herein. According to an example embodiment, the means comprises at least one processor, and memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or device may contain additional blocks or elements.

Although subjects may be referred to as 'first' or 'second' subjects, this does not necessarily indicate an order or importance of the subjects. Instead, such attributes may be used solely for the purpose of making a difference between subjects.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A media data preparation device adapted to receive media data, comprising:
    at least one processor; and
    at least one non-transitory memory having computer program code stored thereon for execution by the at least one processor, the computer program code including instructions to:
        receive a set of metadata that is based on at least one spatial coordinate associated with capture of the media data, wherein the set of metadata is associated with the media data;
        determine a representation of the media data for display to a user in a virtual reality space based on the set of metadata;
        detect a user input at a first location of the representation of the media data in the virtual reality space; and
        perform an operation associated with the media data based on the first location, wherein the operation comprises at least one of initiating a playback of the media data from a portion of the media data associated with the first location, providing a preview of a portion of the media data associated with the first location, or editing the representation of the media data.

2. The media data preparation device according to claim 1, wherein determining the representation of the media data comprises mapping the set of metadata to at least one location in the virtual reality space according to the at least one spatial coordinate.

3. The media data preparation device according to claim 1, wherein the media data comprises a plurality of video frames, and wherein a subset of the set of metadata corresponds to each of the plurality of video frames.

4. The media data preparation device according to claim 1, wherein the set of metadata comprises at least one of location information, motion information or time information associated with the media data.

5. The media data preparation device according to claim 4, wherein at least one of the location information comprises a plurality of locations associated with capture of the media data, or the motion information comprises a plurality of velocities associated with the capture of the media data.

6. The media data preparation device according to claim 4, wherein the motion information comprises at least one of gyroscope data or magnetometer data.

7. The media data preparation device according to claim 1, wherein the representation of the media data comprises a first representation of first media data and a second representation of second media data, and wherein the first representation and the second representation intersect in the virtual reality space.

8. The media data preparation device according to claim 1, wherein the detecting the user input comprises detecting at least one of a body part of the user or a virtual reality controller coinciding with the representation of the media data in the virtual reality space at the first location.

9. The media data preparation device according to claim 1, wherein detecting the user input comprises detecting a head of the user coinciding with the representation of the media data in the virtual reality space at the first location, wherein a position of the head of the user is tracked based on at least one sensor associated with a virtual reality headset.

10. The media data preparation device according to claim 1, wherein the computer program code further includes instructions to perform at least one of:
    determine social network information based on at least one of the representation of the media data or the set of metadata; or
    receive social network information associated with the media data and determine the representation of the media data based on the social network information and the set of metadata.

11. The media data preparation device according to claim 1, wherein the computer program code further includes instructions to:
    receive contextual set of metadata associated with the media data; and
    determine a prediction of at least one event based on at least one of the contextual set of metadata or the set of metadata.

12. A method for preparing media data, comprising:
    receiving, by a media data preparation device, a set of metadata that is based on at least one spatial coordinate associated with capture of the media data, wherein the set of metadata is associated with media data;
    determining, by the media data preparation device, a representation of the media data for display to a user in a virtual reality space based on the set of metadata;
    detecting a user input at a first location of the representation of the media data in the virtual reality space; and
    performing an operation associated with the media data based on the first location, wherein the operation comprises at least one of initiating a playback of the media data from a portion of the media data associated with the first location, providing a preview of a portion of the media data associated with the first location, or editing the representation of the media data.

13. The method according to claim 12, wherein the detecting the user input comprises detecting at least one of a body part of the user or a virtual reality controller coinciding with the representation of the media data in the virtual reality space at the first location.

14. The method according to claim 12, wherein the detecting the user input comprises detecting a head of the user coinciding with the representation of the media data in the virtual reality space at the first location, wherein a position of the head of the user is tracked based on at least one sensor associated with a virtual reality headset.

15. A non-transitory computer readable medium storing a program for execution by a processor, the program including instructions to:
    receive media data;
    receive a set of metadata that is based on at least one spatial coordinate associated with capture of the media data, wherein the set of metadata is associated with the media data;
    determine a representation of the media data for display to a user in a virtual reality space based on the set of metadata;
    detect a user input at a first location of the representation of the media data in the virtual reality space; and
    perform an operation associated with the media data based on the first location, wherein the operation comprises at least one of initiating a playback of the media data from a portion of the media data associated with the first location, providing a preview of a portion of the media data associated with the first location, or editing the representation of the media data.

* * * * *